US008775648B1

(12) United States Patent
Cassidy et al.

(10) Patent No.: US 8,775,648 B1
(45) Date of Patent: Jul. 8, 2014

(54) CONTROL SYSTEMS AND METHODS FOR CLOUD RESOURCE MANAGEMENT

(71) Applicant: Limelight Networks, Inc., Tempe, AZ (US)

(72) Inventors: Sean Cassidy, Seattle, WA (US);
Brandon Smith, Seattle, WA (US);
Pavel Snagovsky, Seattle, WA (US)

(73) Assignee: Limelight Networks, Inc., Tempe, AZ (US)

( * ) Notice: Subject to any disclaimer, the term of this patent is extended or adjusted under 35 U.S.C. 154(b) by 0 days.

(21) Appl. No.: 14/144,448

(22) Filed: Dec. 30, 2013

(51) Int. Cl.
*G06F 15/16* (2006.01)

(52) U.S. Cl.
USPC .......................... 709/229; 709/246

(58) Field of Classification Search
CPC . H04N 21/00; H04N 19/00; H04N 19/00472; H04N 21/23; H04L 65/60
USPC .................. 709/201–203, 227–229, 246–247
See application file for complete search history.

(56) References Cited

U.S. PATENT DOCUMENTS

| | | | |
|---|---|---|---|
| 6,563,517 B1 | 5/2003 | Bhagwat et al. | |
| 7,035,923 B1 | 4/2006 | Yoakum et al. | |
| 7,574,499 B1 | 8/2009 | Swildens et al. | |
| 8,190,674 B2 | 5/2012 | Narayanan et al. | |
| 8,516,529 B2 | 8/2013 | Lajoie et al. | |
| 2006/0015637 A1 | 1/2006 | Chung | |
| 2006/0195464 A1 | 8/2006 | Guo | |
| 2010/0131674 A1* | 5/2010 | Vecchio et al. | 709/246 |
| 2013/0203433 A1 | 8/2013 | Luna et al. | |
| 2013/0254384 A1* | 9/2013 | Wray | 709/224 |

FOREIGN PATENT DOCUMENTS

WO 2013188457 A2 12/2013

OTHER PUBLICATIONS

Han, T. et al., "On Accelerating Content Delivery in Mobile Networks", Retrieved on Jan. 14, 2014 from http://web.njit.edu/~th36/published%20paper/On%20Accelerating%20Content%20Delivery%20in%20Mobile%20Networks.pdf, Oct. 22, 2012, 20 pages, vol. PP, Issue: 99, IEEE Communications Society.
Sivasubramanian, S. et al., "Scalable hosting of web applications", retrieved on Jan. 14, 2014 from http://dare.ubvu.vu.nl/bitstream/handle/1871/10753/7925.pdf?sequence=1, 2007, 232 pages, Vrije Universiteit, Amsterdam, The Netherlands.
Xu, D. et al., "On Peer-to-Peer Media Streaming", Retrieved on Jan. 15, 2014 from http://friends.cs.purdue.edu/pubs/ICDCS02.pdf, 2002, 10 pages, proceedings of the 22nd international conference on distributed computing systems.

* cited by examiner

*Primary Examiner* — Chirag R Patel
(74) *Attorney, Agent, or Firm* — Kilpatrick Townsend & Stockton LLP (57) ABSTRACT

A machine-implementable method for managing cloud-based transcoding resources available to a content delivery network includes maintaining a queue of video transcoding jobs that may be executed by internal transcoders of the content delivery network or by external transcoders of a plurality of cloud-based resources, utilizing a server of the content delivery network. The method further includes determining, at first and second times, corresponding first and second transcoder supply deviations, and a trend indicator; and determining whether to activate, deactivate, or make no change to the number of transcoders that are currently activated for transcoding, based at least on the second transcoder supply deviation and the trend indicator.

20 Claims, 5 Drawing Sheets

CONTROL SYSTEMS AND METHODS FOR CLOUD RESOURCE MANAGEMENT

BACKGROUND

Content delivery networks ("CDNs") typically receive content objects such as video and audio files from their customers such as content providers, and host the content objects on behalf of the content providers. The CDN may include a network of points of presence (POPs) that are geographically distributed so that end users can access the content objects with minimal delays. The CDN may also be responsible for transcoding the content objects into formats that are compatible with a variety of user devices and transmissible at a variety of bitrates. Sometimes the transcoding is done internally, for example within the POPs themselves, or a CDN may choose to use external, cloud based services for at least some of the transcoding. CDNs may also choose to purchase other external resources as needed to complement those resources residing in the POPs themselves.

SUMMARY

In an embodiment, a machine-implementable method for managing cloud-based transcoding resources available to a content delivery network includes maintaining a queue of video transcoding jobs that may be executed by internal transcoders of the content delivery network or by external transcoders of a plurality of cloud-based resources, utilizing a server of the content delivery network. The method further includes determining, at first and second times, corresponding first and second transcoder supply deviations, and a trend indicator; and determining whether to activate, deactivate, or make no change to the number of transcoders that are currently activated for transcoding, based at least on the second transcoder supply deviation and the trend indicator.

In an embodiment, a machine-implementable method for managing cloud-based transcoding resources available to a content delivery network includes, at a first time, determining an average time in which an activated transcoder can complete a transcoding job, determining a desired time for clearance of a transcoding job queue, determining a first number of transcoders that are currently activated for transcoding, designating each job in a transcoding job queue as a high priority job or a low priority job, counting the high priority jobs to generate a first transcoding job backlog, multiplying the first transcoding job backlog by the average time, and dividing the result by the first number of transcoders, to generate a first clearance time estimate, and subtracting the first clearance time estimate from the desired time, and dividing the result of the subtraction by the average time to generate a first transcoder supply deviation. The method further includes, at a second time that is later than the first time, determining a second number of transcoders that are currently activated for transcoding, designating each job in the transcoding job queue as a high priority job or a low priority job, counting the high priority jobs to generate a second transcoding job backlog, multiplying the second transcoding job backlog by the average time, and dividing the result by the first number of transcoders, to generate a first clearance time estimate, subtracting the second clearance time estimate from the desired time, and dividing the result of the subtraction by the average time to generate a second transcoder supply deviation; and subtracting the first transcoder supply deviation from the second transcoder supply deviation to generate a trend indicator. The method further includes determining whether one or more additional transcoders should be activated, or whether one or more of the second number of transcoders should be deactivated, based at least on the second transcoder supply deviation and the trend indicator.

In an embodiment, a content delivery network includes a plurality of points of presence (POPs). Each POP includes a plurality of edge servers, one or more of the edge servers being configurable as a transcoder, and storage for storing one or more of input content objects, transcoded content objects, and software in computer-readable media thereof. The content delivery network further includes a transcoding queue that contains transcoding jobs for execution by internal transcoders of the content delivery network or by external transcoders of a plurality of cloud-based resources, and a transcoding manager. The transcoding manager is configured to send jobs of the transcoding queue to the internal transcoders and the external transcoders and receive completion notifications of the transcoding jobs by the internal transcoders and the external transcoders. At a first time, the transcoding manager determines a first number of the internal transcoders and a first number of the external transcoders that are currently activated for transcoding, generates a first transcoding job backlog from at least high priority jobs in the transcoding queue at the first time, generates a first clearance time estimate based at least on the first transcoding job backlog, on the first number of the internal transcoders, and on the first number of the external transcoders, and generates a first transcoder supply deviation by comparing at least the first clearance time estimate and a desired elapsed time to completion. At a second time, the transcoding manager determines a second number of the internal transcoders and a second number of the external transcoders that are currently activated for transcoding, generates a second transcoding job backlog from at least high priority jobs in the transcoding queue at the second time, generates a second clearance time estimate based at least on the second transcoding job backlog, on the second number of the internal transcoders, and on the second number of the external transcoders, generates a second transcoder supply deviation by comparing at least the second clearance time estimate and the desired elapsed time to completion, generates a trend indicator by comparing the first transcoder supply deviation with the second transcoder supply deviation, and determines whether to activate one or more additional external transcoders for transcoding, deactivate one or more of the second number of the external transcoders from transcoding, or make no change to the second number of the external transcoders that are currently activated for transcoding, based at least on the second transcoder supply deviation and the trend indicator.

Further areas of applicability of the present disclosure will become apparent from the detailed description provided hereinafter. It should be understood that the detailed description and specific examples below, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides exemplary embodiments only, and is not intended to limit the scope, applicability or configuration of the disclosure. Rather, the description will provide those skilled in the art with an enabling description for implementing embodiments. It is understood that various changes may be made in the function and arrangement of elements without departing from the spirit and scope as set forth in the appended claims.

Figure 1:
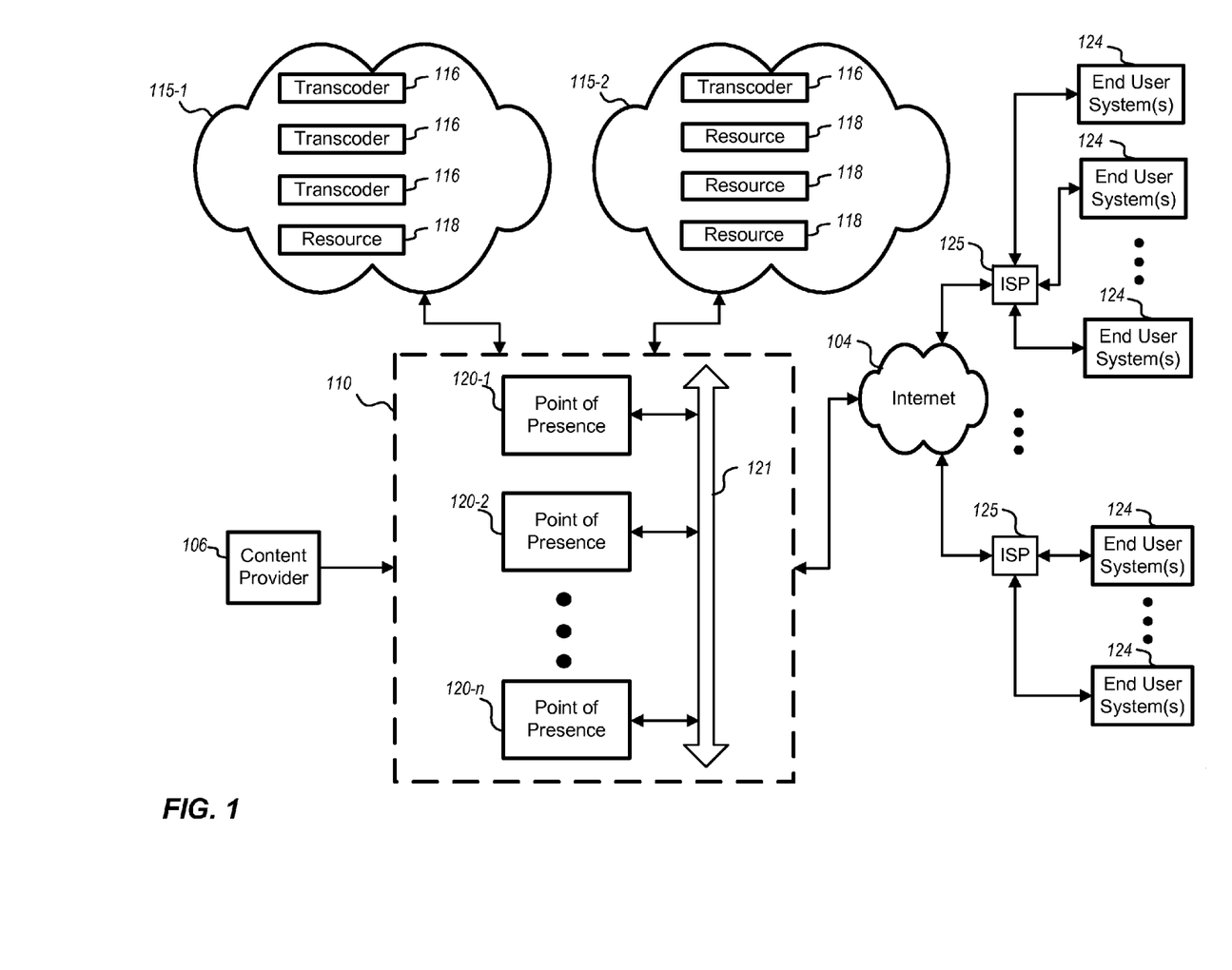
FIG. 1 schematically illustrates major components of a content delivery network that has access to internal and external resources, according to an embodiment.

FIG. 1 schematically illustrates a CDN 110 that has access to internal and external resources, according to an embodiment. In the embodiment of FIG. 1, video content is provided by a content originator 106 and distributed to end user systems 124, which access CDN 110 through the Internet 104 and respective Internet service providers ("ISPs") 125. CDN 110 includes a plurality of POPs 120-(1 through n) that may for example connect with one another over an optional wide area network connection ("WAN") 121. Each POP 120 typically includes edge servers (so called because the POPs are at the "edge" of the network, that is, closest to the end users). POPs 120 may also include storage that hosts copies of content for ready distribution, as described below in connection with FIG. 2. CDN 110 has access to cloud based service providers 115-1, 115-2 that each provide a mix of resources, some of which are shown as transcoders 116 and others of which are shown as resources 118. It is understood that transcoders 116 and resources 118 may be dedicated purpose machines or functionality provided by configuring a server of the cloud based service provider 115 with software. Current examples of cloud based service providers operate under the Amazon, Google, IBM and Microsoft names, and others. Certain connections among components of CDN 110 and components of cloud based service providers 115 are omitted in FIG. 1 for clarity of illustration. Also, the numbers of cloud based service providers 115, transcoders 116, resources 118, POPs 120, ISPs 125 and end user systems 124 shown in FIG. 1 are arbitrary; any number of such items may exist.

Although the present control systems and methods for cloud resource management are illustrated within the context of use by content delivery system, it will be apparent upon reading and understanding the present disclosure that the techniques herein may be adapted to other systems that manage content, distribute content to users etc. and have similar needs that could be sourced internal to the systems or externally (e.g., via cloud resources).

Content provider 106 may for example provide content objects in the form of video files such as raw video footage, movies, commercials and the like, or audio files. The content objects may be transcoded into a variety of file types that are optimized for different purposes. For example, certain formats are optimized to minimize memory space, while others are optimized for transmission according to various formats and/or transmission bitrates. Possible initial and/or desired post-transcoding formats include MOV, M2TS, MXF, OGM, RMVB, RM, WMV, QT, WebM, FLV, MOD, TS, TP, DVR-MS, Divx, AVI, WMV, MP4, MPEG-1, MPEG-2, FLV, SWF, MKV, 3GP, 3G2, AVCHD (*.M2TS, *.MTS, *.TOD), HD MKV, HD H.264/MPEG-4 AVC, HD MPEG-2, HD MPEG Transport Stream (*.TS, *.TP, *.M2T), MP3, Flac, WMA, M4A, OGG, WAVE, AAC and others.

Figure 2:
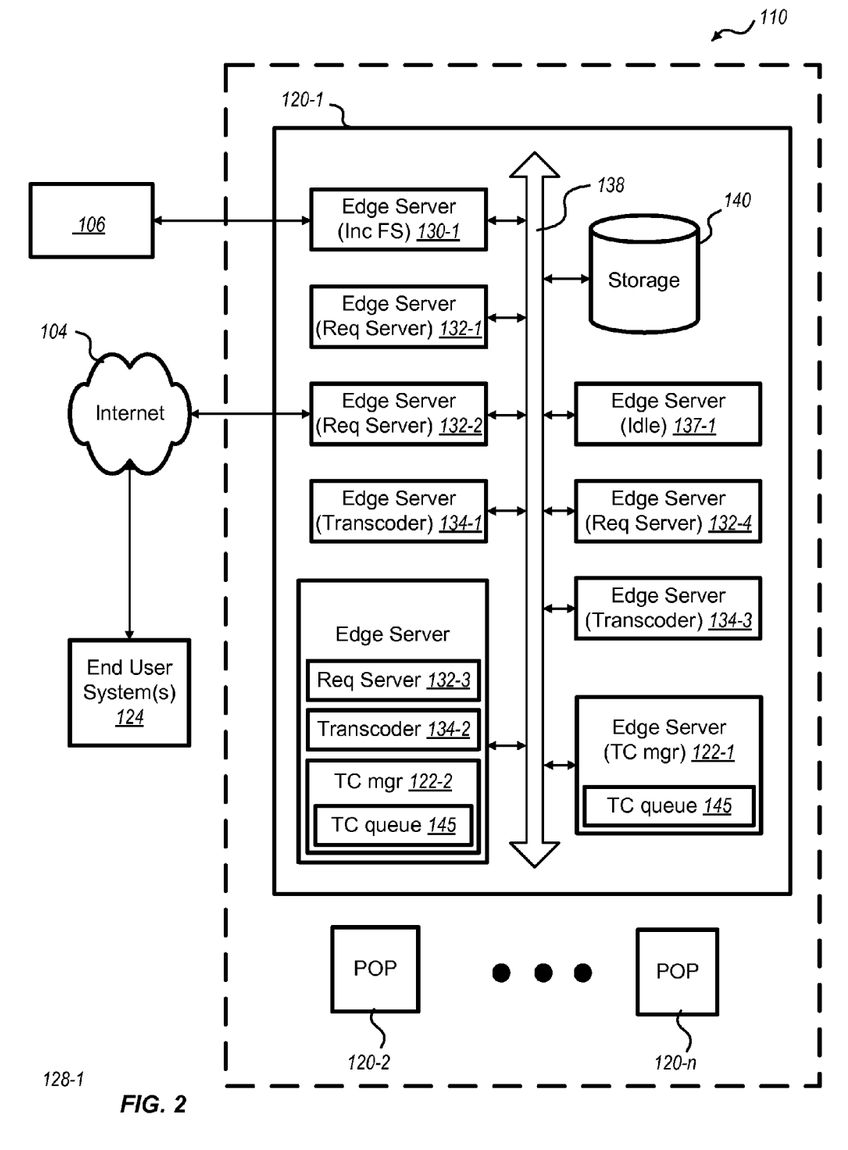
FIG. 2 schematically illustrates the system of FIG. 1 including details of a point of presence (POP) thereof, according to an embodiment.

FIG. 2 schematically illustrates system 100, including exemplary details of point of presence (POP) 120-1, according to an embodiment. POP 120-1 includes multiple edge servers that support intake and transcoding of content objects, receive requests from end users for the content objects, forward content objects to the requesting end users, perform financial accounting for serving the content objects, and other support functions for the CDN. The edge servers may be configurable through software to serve a variety of purposes. For example, in POP 120-1, one edge server is configured as an incoming file server 130-1, five edge servers are configured as request servers 132-(1 through 5), three edge servers are configured as transcoders 134-(1 through 3), and one edge server is configured as a transcoding manager 122-1. The designation of most of the edge servers in FIG. 2 as supporting only one particular function is for clarity of illustration only; in embodiments, a given edge server may be configured through software to support more than one of the incoming file server, codec, request server, watermark engine and/or other functions. In particular, a single edge server may be configured to perform any or all of the request server, transcoding and transcoding manager functions as needed relative to a single content object, in response to a request for the content object, such as the edge server shown that acts as request server 132-3, transcoder 134-2 and transcoding manager 122-2. POP 120-1 also includes a storage capability 140 for incoming files, transcoded files, software, accounting data and any other data for which storage is required. Edge servers, storage 140 and/or any other components of POP 120-1 communicate with one another; in FIG. 2 such communication is shown as taking place over a local area network ("LAN") 138, but other forms of communication among components of POP 1120-1 may be utilized. Also, exemplary connections are shown between content originator 106 and incoming file server 130-1, and between internet 104 and request server 132-2, but it is understood that such connections are typically arranged in software, based on a domain name server (not shown) determining which edge server is designated as corresponding to a given domain name request from content originator 106 or end user system 124-1. CDN 110 also includes other POPs 120, of which only POP 120-2 and POP 120-n are shown in FIG. 2, for clarity of illustration. It will be understood by one skilled in the art upon reading and understanding the present disclosure, that equivalent functionality of an incoming file server 130, a request server 132, a transcoder 134 and/or a transcoding manager 122 may also be provided within CDN 110 by any appropriate combination of processing capability configured by software, and storage, within CDN 110 (e.g., not necessarily within a POP).

It may be advantageous for CDN 110 to utilize internal resources for tasks such as transcoding, because the utilization of existing resources is typically inexpensive given that the physical equipment is already installed and perhaps otherwise idle. The physical equipment of CDN 110 is usually a relatively fixed overhead cost, while its incremental operating cost is usually lower. When external resources such as transcoders 116 or resources 118 are utilized, CDN 110 is typically charged by the cloud based service provider 115, either directly or through a debit and credit scheme, eventually resulting in payment (or non-realization) of revenue by CDN 110 that likely exceeds the cost to perform a given job internally—if there are internal resources available to do the job (both requests, and actual execution of the requests, for tasks such as transcoding of a content object, are sometimes called "jobs" herein). However, CDN 110 also seeks to maximize utilization of installed capacity and therefore does not wish to overbuild its hardware, so a mix of internal and external sourcing of jobs such as transcoding may be utilized. For example, in the case of transcoding needs, jobs may be sent to internal transcoders unless the resources are operating at full capacity, and excess jobs may be sent to external transcoders.

Shifting jobs to external transcoders not only costs CDN 110 more, but carries other cost risks if used inefficiently. For example, cloud based service providers 115 may charge a one-time fee for activating a transcoder for use, e.g., to load software and begin processes to receive and execute transcoding jobs. Providers 115 may also bill for use of a transcoder or other resource by the minute from the time activation begins until the resource is completely deactivated. Such deactivation entails either waiting until all jobs in process are completed, or "pulling the plug" by deactivating with partially completed jobs in process. The partially completed jobs may have to be transferred in pieces to other transcoders, or simply discarded. Embodiments herein recognize these inefficiencies and provide control systems and methods for efficiently managing cloud resources such as, but not limited to, transcoders.

Referring now as needed to FIG. 1 and/or FIG. 2, content originators 106 provide content objects to CDN 110, which serves requests from end users 128 with copies of the content objects. Because of the variety of formats required by end users, a newly received content object is typically transcoded into a variety of formats upon receipt. In embodiments, a transcoding manager 122 is notified of incoming content objects, and generates a set of job requests (or simply "jobs") for transcoding that include information associated with each of the jobs such as location of the input content object, desired location of the output content object, format being translated from and to, job priority and the like. Transcoding manager 122 may form, or send newly created jobs to, transcoding queue 145, where the jobs await a transcoder for execution. Although FIG. 2 shows transcoding queue 145 associated with transcoding managers 122-2 and 122-2, it is understood that transcoding queue 145 is not necessarily located within one or even both of the edge servers indicated; that is, the information that forms transcoding queue 145 may be located elsewhere in POP 120-1 (such as, for example, storage 140) or may be distributed among physical servers and/or storage of POP 120-1, or among POPs of CDN 110. Jobs in transcoding queue 145 may be designated as high priority, as low priority or as some other level of priority. In some embodiments, all jobs may be designated as high priority; alternatively, jobs that call for transcoding into obscure or less requested formats, for example, may be designated as low priority. Transcoding jobs may be submitted into transcoding queue 145 for execution by incoming file servers 130 in response to newly received content objects, or may be submitted by request servers 132 in response to received requests for content in a format for which a transcoded copy does not currently exist.

Embodiments herein recognize not only the need to adjust resources such as transcoding resources to serve a given demand, but also the need to utilize external resources effectively once they are activated. For example, once activated, it may be desirable to keep an external transcoder activated until not only an excess of transcoding jobs has been worked off by the combination of internal and external transcoders, but also until sequential decreases in transcoding queue 145 indicate that a decrease in demand is significant and not a momentary fluctuation. It may also be desirable to monitor transcoding queue 145 for jobs that can be chosen to keep an external transcoder busy until all of its pending jobs finish at about the same time, to minimize expensive idle time before the transcoder can be deactivated. Conversely, it may be desirable not to activate an external transcoder at all unless both an excess of transcoding jobs is in transcoding queue 145, and sequential increases in the queue indicate that the increase of demand is significant compared to fluctuations.

Figure 3A:
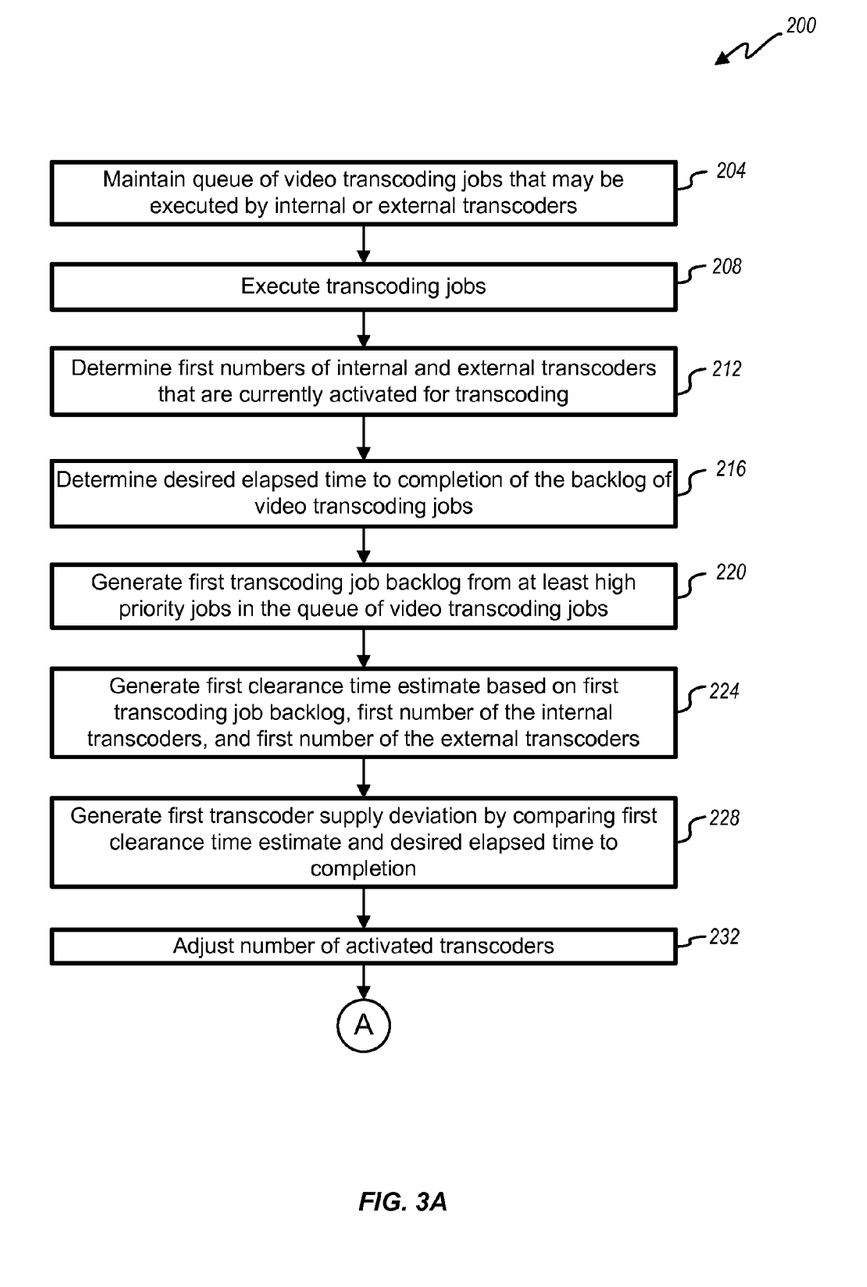
FIGS. 3A and 3B illustrate a method for managing cloud-based transcoding resources available to a content delivery network, according to an embodiment.
Figure 3B:
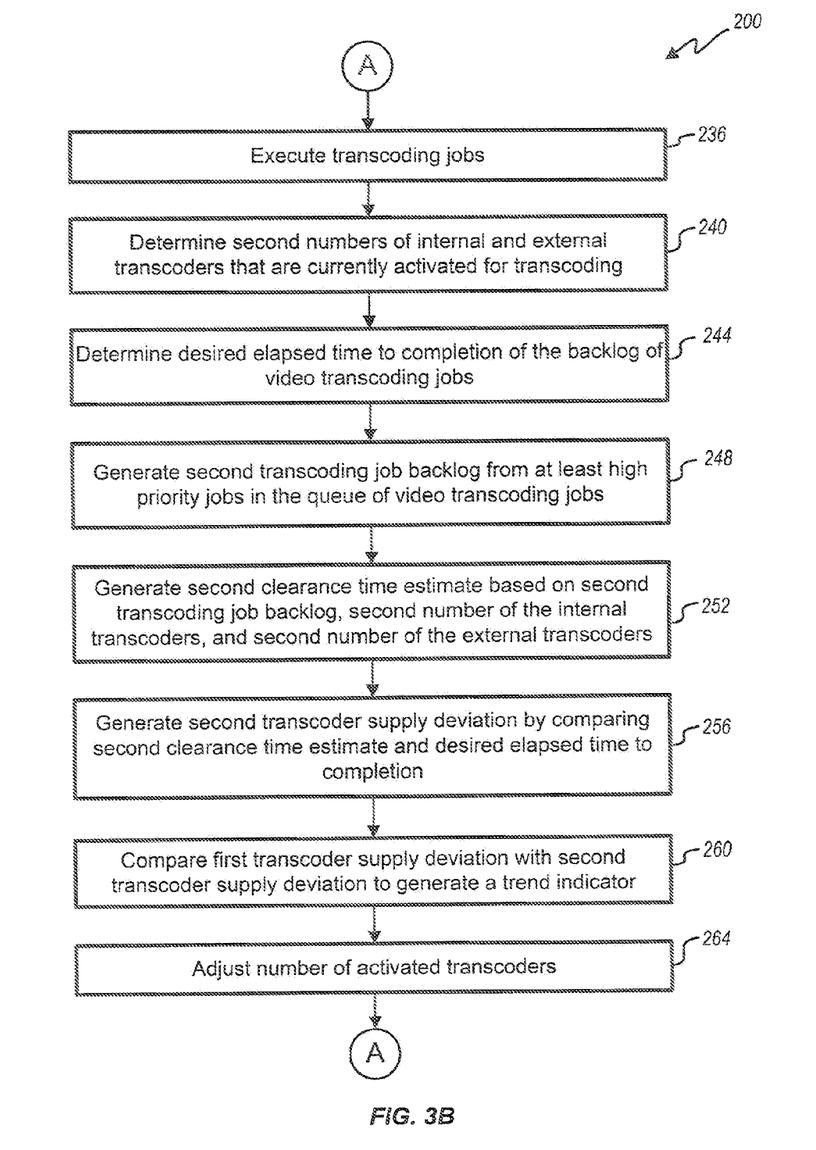

FIGS. 3A and 3B illustrate a method 200 for managing cloud-based transcoding resources available to a content delivery network. Method 200 may be executed by transcoding manager 122 of CDN 110, either with transcoding manager 122 functionality being provided by an edge server of a POP 120 as shown in FIG. 2, or with equivalent functionality provided by appropriate software-configured processing and/or storage capabilities elsewhere in CDN 110. It is contemplated that certain steps of method 200 need not necessarily be performed in the order indicated, but may be performed out of order, or repeated, as needed.

Step 204 of method 200 maintains a queue of video transcoding jobs that may be executed by internal transcoders of the content delivery network, or by external transcoders of a plurality of cloud-based resources. An example of step 204 is one of transcoding managers 122-1 or 122-2, FIG. 2, maintaining transcoding queue 145. As noted above, the queue may receive transcoding job requests from an incoming file server 130 or a request server 132; transcoding manager 122 may also initiate jobs itself (e.g., it may initiate replacement jobs for jobs that did not end well). Each entry in the job queue may include, for example, one or more of a pointer to the source content object to be transcoded, an address or storage location where the transcoded content object should be sent, metadata for the original and/or transcoded object such as format type, file size, content object creation date and time, identity of the content provider, job creation date and time, job priority and/or other parameters specific to the job. The job queue may be kept as a "live" copy in active memory of the transcoding manager, or may consist of a series of entries placed into and fetched from storage, or a combination of live and stored information. Both internal and external transcoders communicate with the transcoding manager to request jobs and to acknowledge completion of jobs. Thus, step 208 executes at least a first portion of the transcoding jobs by utilizing a first number of the internal transcoders. The jobs selected for execution are tracked by the transcoding manager, and may be selected on a first in/first out basis depending on their submission times to the queue, based on an assigned priority, or based on other criteria. Execution of jobs is noted at step 208 to signify that jobs are running, thus the transcoding queue has jobs in it and some combination of internal and/or external transcoders is available for analysis in the following steps; execution of the jobs does not stop but proceeds in parallel when the steps following step 208 in FIGS. 3A and 3B are executed.

As transcoding jobs are executed, from time to time, the transcoding manager evaluates the transcoding job queue in order to determine whether to turn on or off external transcoders. The evaluation times may be scheduled frequently (e.g., once per minute or less) or less frequently (e.g., once or twice per hour). In embodiments, it should be apparent that for jobs and job queues related to tasks other than transcoding, even more frequent or even less frequent evaluations could be appropriate. Each evaluation determines the capability of the existing, activated resources to keep up with demand, and generates a current supply deviation number, as compared to the number of currently activated resources. In order to translate backlog to a number of activated resources needed, the transcoding manager uses a job completion rate per activated transcoder that can be modeled, empirically determined and/or refined over time using historical data, and uses a desired elapsed time to backlog completion as a goal against which resources may be adjusted accordingly. Finally, sequential evaluations are utilized in order to generate trend information that can also be utilized to adjust resources.

The evaluation begins with step 212 determining, at a first time, how many internal and external transcoders are currently activated for transcoding. An example of step 212 is transcoding manager 122, FIG. 2, creating or maintaining a count of currently activated internal and external transcoders. Step 216 determines a desired time to completion for the present transcoding queue. The outcome of step 216 is not necessarily driven by data but instead is typically a goal, knowing that transcoding jobs cannot be completed immediately but that some goal for completion of the queue is necessary to set resource levels. Setting the desired completion time carries consequences; setting it to a short time will result in assignment of more resources, possibly driving up cost but increasing throughput of the system and reduce delays, while setting it to a longer time will allow the system to run with fewer resources, possibly reducing costs but resulting in longer transcoding delays. Step 216 may be set once as method 200 begins, and thereafter not repeated (e.g., eliminating step 244 below) or may be changed from time to time as desired to drive performance of the system towards higher performance or lower cost, as discussed above.

Method 200 continues with step 220 generating a first transcoding job backlog from at least high priority jobs in the queue of transcoding jobs. As noted above, all jobs in the queue may be considered high priority jobs by default, or high and low priority may be determined by user demand or other criteria. In certain embodiments, priorities are assigned as high or low, while in others, a more granular priority scale may be used. The designation of jobs as high priority as noted in step 220 is so that the transcoding manager can objectively determine a backlog of jobs that should drive internal and external resource utilization.

Step 224 generates a first backlog clearance time estimate based at least the first transcoding job backlog, determined in step 220, and the first numbers of internal and external transcoders that are currently activated for transcoding, determined in step 212. In embodiments, it may be advantageous to calculate or model a typical completion rate of transcoding jobs over time per activated transcoder, so that the first backlog clearance time estimate can be obtained by dividing the first transcoding job backlog by the typical completion rate, and by the sum of internal and external transcoders that are currently activated. In some of these embodiments, even more granular information such as processing power of each of the activated transcoders, size of the files in the backlog, estimates of completion rate for various transcoding format conversions in the backlog, etc. can be utilized to refine the determined completion rate.

The following notation is sometimes used for some of the calculations done by embodiments herein, although the systems and methods are not limited to such embodiments. In general, specific times are designated with a lower case t and time intervals are designated with a capital T. Times at which evaluation steps are performed are therefore designated as $t_1$, $t_2$, ... and other variables calculated or modeled at these times bear similar, corresponding subscripts 1, 2, .... For example, the first time designated above in connection with step 212 may be designated as $t_1$. Numbers of transcoders are designated as N; thus first numbers of internal and external transcoders that are activated for transcoding (e.g., in step 212) are designated as $Ni_1$ and $Ne_1$. The desired elapsed time to completion (e.g., as determined in step 216) is designated as Td. When the transcoding job queue contains jobs that are designated as high or low priority, these jobs may be designated as Jh and Jl respectively. When a sum of the high priority jobs is generated, it may be designated as $\Sigma Jh$, understanding that each job normally has a value of 1, but weighting could be performed based on size or other characteristics of transcoding jobs, as discussed above. In step 224, the first clearance time estimate may, in embodiments, be designated as $Tec_1$, and calculated as $$Tec_1 = \Sigma Jh_1/(R*(Ni_1+Ne_1))$$

where R is the average rate of jobs completed per transcoder per unit time, and all of the variables are evaluated at t1. Again, it is emphasized that the mathematical treatment above is but one approach to generating a first clearance time estimate; other approaches will be apparent to those skilled in the art.

The first backlog clearance time estimate is a current system performance measure that can be compared with the goal defined in step 216, as a first step in deciding whether resources should be added or removed from the system. As a final step in the first round of the evaluation process, step 228 generates a first transcoder supply deviation, by comparing at least the first clearance time estimate and the desired elapsed time to completion. For example, the first transcoder supply deviation could be generated by subtracting the desired time to completion from the first backlog clearance time estimate. A positive result signifies the time in which the existing resources will take to clear the backlog beyond the desired time to completion, while a negative result signifies the time in which existing resources will clear the backlog before the desired time to completion. In embodiments, this result can further be converted to a surplus or deficit number of transcoders needed to meet the goal exactly, by dividing the result by the average job completion rate discussed above. Thus, in such embodiments, the transcoder surplus or deficit can be expressed as $\Delta N$, and calculated as $$\Delta N_1 = (Tec_1 - Td_1)/R$$

such that $\Delta N_1$ signifies a number of transcoders that should, theoretically, be activated or deactivated for the system to clear the backlog in the desired time. When $\Delta N_1$ is positive, additional transcoders should be activated to bring down the estimated time to clear the backlog, while when $\Delta N_1$ is negative, transcoders may be deactivated, and the estimated time to clear the backlog will increase.

Once $\Delta N_1$ is determined, an optional step 232 adjusts resources based on $\Delta N_1$, however, adjustments may be disadvantageous at this point because of the potential for inefficient use of external resources, as discussed above. Further options for adjusting resources are discussed below.

After step 232, shown in FIG. 3A, method 200 continues at label A shown in FIG. 3B. Method 200 continues with steps 236 through 256, which are similar to steps 208 through 228. Step 236 executes transcoding jobs, that is, the transcoding jobs discussed above with respect to step 208 continue to run. At a second time (or a third time, etc. that may be designated as t2, t3, etc.) with the transcoding jobs still running, step 240 determines second (third, etc.) numbers of internal and external transcoders that are currently activated for transcoding; these may be the same as, or may differ from, the corresponding numbers that were determined in step 212. In accordance with the convention defined above, these numbers may be designated $Ni_2$ and $Ne_2$ (and may take the appropriate numeric subscripts if determined at time t3, t4 etc.)

Like step 216, step 244 determines a desired elapsed time to completion of the backlog of transcoding jobs. Usually the desired elapsed time is a fixed number throughout method 200, but it may in fact be modified, and may be designated as $Td_2$ ($Td_3$, etc.). Like step 220, step 248 generates a second (third, etc.) transcoding job backlog from at least high priority jobs in the transcoding job queue. Like step 224, step 252 generates a second (third, etc.) clearance time estimate based on the second (third, etc.) transcoding backlog and the second (third, etc.) numbers of internal and external transcoders that are currently activated for transcoding. Assuming these steps are done around time t2, the resulting calculation may be designated as $$Tec_2 = \Sigma Jh_2/(R^*(Ni_2+Ne_2))$$

The second backlog clearance time estimate is a current system performance measure that can be compared with the goal defined in either of steps 216 or 244. Step 256 generates a second transcoder supply deviation, by comparing at least the second clearance time estimate and the (first or second) desired elapsed time to completion. The second clearance time estimate can be used in similar ways as the first clearance time estimate discussed above; especially, in embodiments, it can further be converted to a surplus or deficit number of transcoders needed to meet the goal exactly, by dividing the result by the average job completion rate. In such embodiments, the transcoder surplus or deficit can be calculated as $$\Delta N_2 = (Tec_2 - Td_2)/R$$

such that $\Delta N_2$ signifies a number of transcoders that should, theoretically, be activated or deactivated for the system to clear the backlog in the desired time.

Step 260 generates a trend indicator by comparing the first and second transcoder supply deviations. For example, in embodiments, the first transcoder supply deviation can be subtracted from the second transcoder deviation to yield the trend indicator:

$$TI = \Delta N_2 - \Delta N_1$$

where TI is the trend indicator. The trend indicator can be used, and similar indicators can be calculated and used, in a variety of ways to determine whether one or more additional transcoders should be activated, or whether one or more of the currently running transcoders should be deactivated. For example, when the trend indicator indicates a trend that is opposite to the change that would otherwise be indicated by the second transcoder supply deviation, it indicates that demand has recently moved in the opposite direction from a previous demand trend, such that it may be prudent not to activate or deactivate any transcoders without waiting longer. Conversely, when the trend indicator indicates a trend that is in the same direction as the change that would otherwise be indicated by the second transcoder supply deviation, it indicates that change in demand is accelerating, strongly suggesting activation or deactivation of one or more transcoders. The trend indicator and the second transcoder supply deviation can be optionally weighted and combined to form a single FIGURE of merit indicating whether one or more transcoders should be activated or deactivated. Also, upon repeated execution of steps 236 through 260, multiple values of the trend indicator can be combined into a single overall trend indicator, or can be otherwise analyzed for magnitude and consistency to yield a useful metric for the need to activate or deactivate transcoders. After step 264, in which the number of transcoders is adjusted if necessary, method 200 returns to label A, thus forming a loop of executing, evaluating and adjusting the number of transcoders available.

In embodiments, further strategies or rules are implemented for improving the cost effective use of external resources in a demand driven environment. In a first case, either of the first or second transcoder supply deviations is simply ignored until its magnitude exceeds some threshold value in the positive or negative direction. For example, an upper threshold value may be set at 1.2, such that no additional transcoder is activated until the first or second transcoder supply deviation exceeds 1.2 (assuming all of the inputs are weighted such that the supply deviation number is in units of transcoders). Ignoring lower values of the supply deviation causes the system to not react until and unless an extra transcoder would be fully utilized. Conversely, if the supply deviation is below zero, no transcoder might be deactivated until the deviation is less than a lower threshold of −1.2 such that once deactivated, it would be unlikely that the transcoder would be needed again soon. The thresholds need not be of the same value in the positive and negative directions. Setting the thresholds as noted above, thus setting a "no change" window between the upper and lower threshold, also avoids the situation where a transcoder might be activated and deactivated repeatedly because the supply deviation oscillates over a small range due to rounding errors. A similar strategy can be based on a rule that does not allow a transcoder to be deactivated until some duration of time since that transcoder was activated, or vice versa.

In a second case, once a determination is made that a transcoder is to be deactivated, its operation is managed to keep it as busy as possible until a projected deactivation time, without leaving any jobs partially completed at that time. Considering a case where a transcoder can handle a given number of jobs concurrently, but each job takes an amount of time that is proportional to the size of the corresponding input content object, a transcoding manager can determine at the time a decision is made to deactivate a given transcoder, what currently "longest running" job will take the longest to complete. As other jobs complete ahead of the longest running job, the transcoding manager can override the priority system normally observed in the transcoding queue, to pick jobs that can be started and finished within, (or approximately within) the time as the longest running job. Once the assigned jobs finish at approximately the same time, the transcoder can be deactivated without incurring expensive idle time.

Figure 4A:
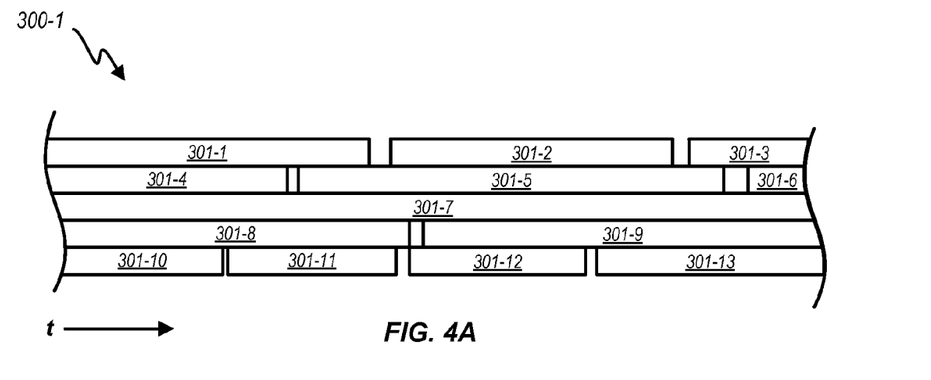
FIG. 4A shows a timing diagram that illustrates sequential starting and completion of transcoding jobs in a transcoder, according to an embodiment.
Figure 4B:
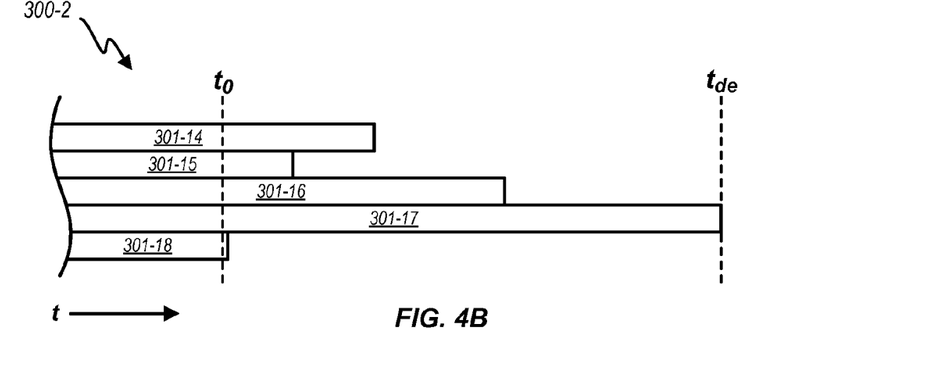
FIG. 4B shows a timing diagram that is an exemplary snapshot of running jobs, and a projection of time-to-job-completion for these jobs, on the transcoder illustrated in FIG. 4A, according to an embodiment.
Figure 4C:
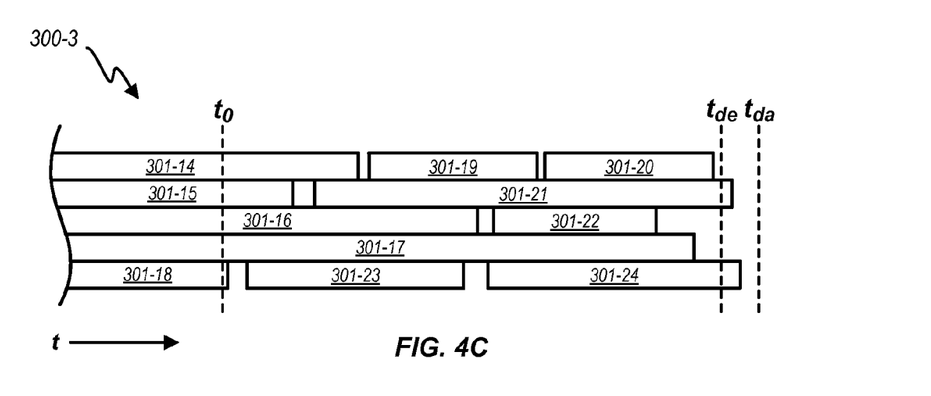
FIG. 4C shows a timing diagram of the same transcoder as shown in FIG. 4B, illustrating completion of jobs that were running, plus newly assigned jobs that all complete near the same time, according to an embodiment.

This is illustrated in FIGS. 4A through 4C. FIG. 4A shows a timing diagram 300-1 that illustrates sequential starting and completion of transcoding jobs 301-1 through 301-13 in a transcoder (e.g., any of external transcoders 116, FIG. 1, or internal transcoders 134, FIG. 2). The transcoder illustrated by FIG. 4A supports five concurrent transcoding jobs, which number is only for the sake of illustration. As each transcoding job 301 is completed, the transcoder is given another job to work on. FIG. 4B shows a timing diagram 300-2 that is an exemplary snapshot of running jobs 301-14 through 301-18, and a projection of time-to-job-completion for these jobs, on the same transcoder as illustrated in FIG. 4A. In FIG. 4B, at a time indicated as to, a decision is made to deactivate the transcoder. A transcoding manager (e.g., transcoding manager 122, FIG. 2) knows what jobs are running and can estimate how long each such job will run. In the case shown in FIG. 4B, job 301-17 is estimated to be the longest running job and is estimated to complete at an estimated deactivation time time $t_{de}$. As the transcoding jobs complete, the transcoding manager can look through a transcoding queue (e.g., transcoding queue 145), possibly ignoring assigned priorities, and picking out jobs that can be completed by or around $t_{de}$. FIG. 4C shows a timing diagram 301-3 of the same transcoder as shown in FIG. 4B, illustrating completion of jobs 301-14 through 301-18 that were running at $t_0$, plus newly assigned jobs 301-19 through 301-24, that all complete near $t_{de}$. The accuracy with which job completion is forecast and with which new jobs are assigned may not be perfect, such that the transcoder is not always operating on five jobs at once, with such times increasing towards $t_{de}$, and such that some jobs run beyond $t_{de}$. When time to $t_{de}$ is insufficient to complete any further jobs, the transcoding manager ceases to assign additional jobs, waits for all existing jobs to finish, and after they do, deactivates the transcoder at a time $t_{da}$. In embodiments, the accuracy with which job completion is estimated and jobs are assigned is such that all pending jobs for the transcoder are completed within a thirty second, or less, time window.

In any of the cases discussed above, a transcoding manager may also follow rules related to evaluating cost of external resources. For example, once a decision is taken to deactivate one or more external transcoders, the transcoding manager may evaluate relative costs of currently activated external transcoders and target the transcoders with the highest cost for deactivation. Similarly, cost and performance can be bundled into relative operational cost figures of merit, such as cost per transcoding job, cost per megabyte of transcoding, and the like, so that the transcoding manager can evaluate based on such figures of merit.

Although the above discussion centers on activation of external resources as transcoders, it should remain clear that the techniques disclosed are equally applicable to other uses of external resources, and/or transcoding or other uses of internal resources. For example, with reference to FIG. 1, when an edge server can be configured as one of (or more than one of) an incoming file server, a request server and a transcoder, there may be better use for a given resource at a given time than transcoding. However, efficiency considerations may weigh in favor of keeping a given edge server configured and running in one capacity instead of repeatedly reconfiguring the edge server for different tasks. Therefore, similar techniques and rules as those discussed above may be implemented to manage deployment of edge servers for any type of task that involves reconfiguring the edge server or portions thereof.

Variations and modifications of the disclosed embodiments will become evident to one skilled in the art upon reading and appreciating the present disclosure, and can also be used. Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A machine-implementable method for managing cloud-based transcoding resources available to a content delivery network, comprising:
maintaining a queue of video transcoding jobs that may be executed by internal transcoders of the content delivery network or by external transcoders of a plurality of cloud-based resources, wherein maintaining comprises utilizing a server of the content delivery network;
executing at least a first portion of the transcoding jobs by utilizing a first number of the internal transcoders;
at a first time:
determining the first number of the internal transcoders and a first number of the external transcoders that are currently activated for transcoding,
determining a desired elapsed time to completion of the backlog of video transcoding jobs,
generating a first transcoding job backlog from at least high priority jobs in the queue of video transcoding jobs,
generating a first clearance time estimate based at least on the first transcoding job backlog, on the first number of the internal transcoders, and on the first number of the external transcoders, and
generating a first transcoder supply deviation by comparing at least the first clearance time estimate and the desired elapsed time to completion;
executing at least a second portion of the transcoding jobs by utilizing a second number of the internal transcoders; and
at a second time that is later than the first time,
determining the second number of the internal transcoders and a second number of the external transcoders that are currently activated for transcoding,
generating a second transcoding job backlog from at least high priority jobs in the queue of video transcoding jobs,
generating a second clearance time estimate based on the second transcoding job backlog, on the second number of the internal transcoders, and on the second number of the external transcoders,
generating a second transcoder supply deviation by comparing the second clearance time estimate and the desired elapsed time to completion,
comparing the first transcoder supply deviation with the second transcoder supply deviation to generate a trend indicator, and
determining whether to activate one or more additional external transcoders for transcoding, deactivate one or more of the second number of the external transcoders from transcoding, or make no change to the second number of the external transcoders that are currently activated for transcoding, based at least on the second transcoder supply deviation and the trend indicator.

2. The machine-implementable method for managing cloud-based transcoding resources available to a content delivery network of claim 1, further comprising activating one or more of additional external transcoders for transcoding, of deactivating one or more of the first number of the external transcoders from transcoding, based on the first transcoder supply deviation at the first time.

3. The machine-implementable method for managing cloud-based transcoding resources available to a content delivery network of claim 1, further comprising activating one or more additional internal transcoders for transcoding, or deactivating one or more of the second number of the internal transcoders from transcoding, based on the second transcoder supply deviation and the trend indicator.

4. The machine-implementable method for managing cloud-based transcoding resources available to a content delivery network of claim 1, activating one or more of the additional external transcoders for transcoding, deactivating one or more of the second number of the external transcoders from transcoding, or making no change to the second number of the external transcoders that are currently activated for transcoding, comprises determining a weighted sum of the second transcoder supply deviation and the trend indicator.

5. The machine-implementable method for managing cloud-based transcoding resources available to a content delivery network of claim 4, wherein activating one or more of the additional external transcoders for transcoding is based on the weighted sum being greater than a first threshold.

6. The machine-implementable method for managing cloud-based transcoding resources available to a content delivery network of claim 5, wherein deactivating one or more of the second number of the external transcoders from transcoding is based on the sum being less than a second threshold.

7. The machine-implementable method for managing cloud-based transcoding resources available to a content delivery network of claim 6, wherein the first and second thresholds are the same.

8. The machine-implementable method for managing cloud-based transcoding resources available to a content delivery network of claim 6, wherein the first threshold is greater than the second threshold.

9. The machine-implementable method for managing cloud-based transcoding resources available to a content delivery network of claim 1, wherein deactivating one or more of the second number of the external transcoders from transcoding comprises:
identifying the one or more of the second number of the external transcoders that should be deactivated, and
managing jobs selected for the one or more of the second number of the external transcoders that should be deactivated such that all pending jobs for respective ones of the one or more transcoders are completed within a thirty second time window.

10. The machine-implementable method for managing cloud-based transcoding resources available to a content delivery network of claim 1, further comprising:
storing the trend indicator as a first trend indicator; and
at a third time:
determining a third number of the internal transcoders and a third number of the external transcoders that are currently activated for transcoding,
generating a third transcoding job backlog from at least high priority jobs in the queue of video transcoding jobs,
generating a third clearance time estimate based on the third transcoding job backlog, on the third number of the internal transcoders, and on the third number of the external transcoders, generating a third transcoder supply deviation by comparing the third clearance time estimate and the desired elapsed time to completion, comparing the second transcoder supply deviation with the third transcoder supply deviation to generate a second trend indicator; and wherein activating one or more additional external transcoders for transcoding, deactivating one or more of the second number of the external transcoders from transcoding, or making no change to the second number of the external transcoders that are currently activated for transcoding, is also based on a weighted sum of the first trend indicator and the second trend indicator.

11. The machine-implementable method for managing cloud-based transcoding resources available to a content delivery network of claim 1, wherein external transcoders that are currently activated for transcoding include transcoders of two or more of the plurality of cloud-based resources, and wherein deactivating one or more of the second number of the external transcoders from transcoding comprises selecting the one or more of the second number of the external transcoders based on relative operational cost of the external transcoders that are currently activated for transcoding.

12. The machine-implementable method for managing cloud-based transcoding resources available to a content delivery network of claim 1, wherein activating one or more additional external transcoders for transcoding comprises selecting the one or more additional external transcoders from the plurality of cloud-based resources based on relative operational cost of the external transcoders.

13. A machine adapted to perform the machine-implementable method for managing cloud-based transcoding resources available to a content delivery network of claim 1.

14. A machine-implementable method for managing video transcoding resources of a content delivery network, comprising:

at a first time:
determining an average time in which an activated transcoder can complete a transcoding job,
determining a desired time for clearance of a transcoding job queue,
determining a first number of transcoders that are currently activated for transcoding,
designating each job in a transcoding job queue as a high priority job or a low priority job,
counting the high priority jobs to generate a first transcoding job backlog,
multiplying the first transcoding job backlog by the average time, and dividing the result by the first number of transcoders, to generate a first clearance time estimate,
subtracting the first clearance time estimate from the desired time, and dividing the result of the subtraction by the average time to generate a first transcoder supply deviation; and at a second time that is later than the first time,
determining a second number of transcoders that are currently activated for transcoding,
designating each job in the transcoding job queue as a high priority job or a low priority job,
counting the high priority jobs to generate a second transcoding job backlog,
multiplying the second transcoding job backlog by the average time, and dividing the result by the first number of transcoders, to generate a first clearance time estimate, subtracting the second clearance time estimate from the desired time, and dividing the result of the subtraction by the average time to generate a second transcoder supply deviation;
subtracting the first transcoder supply deviation from the second transcoder supply deviation to generate a trend indicator; and
determining whether one or more additional transcoders should be activated, or whether one or more of the second number of transcoders should be deactivated, based at least on the second transcoder supply deviation and the trend indicator.

15. A content delivery network, comprising:
a plurality of points of presence (POPs), each POP including:
a plurality of edge servers, one or more of the edge servers being configurable as a transcoder, and
storage for storing one or more of input content objects, transcoded content objects, and software in computer-readable media thereof;
a transcoding queue that contains transcoding jobs for execution by internal transcoders of the content delivery network or by external transcoders of a plurality of cloud-based resources; and
a transcoding manager that is configured to:
send jobs of the transcoding queue to the internal transcoders and the external transcoders,
receive completion notifications of the transcoding jobs by the internal transcoders and the external transcoders,
update the transcoding queue upon receiving the notifications,
determine, at a first time, a first number of the internal transcoders and a first number of the external transcoders that are currently activated for transcoding,
generate a first transcoding job backlog from at least high priority jobs in the transcoding queue at the first time,
generate a first clearance time estimate based at least on the first transcoding job backlog, on the first number of the internal transcoders, and on the first number of the external transcoders,
generate a first transcoder supply deviation by comparing at least the first clearance time estimate and a desired elapsed time to completion,
determine, at a second time, a second number of the internal transcoders and a second number of the external transcoders that are currently activated for transcoding,
generate a second transcoding job backlog from at least high priority jobs in the transcoding queue at the second time,
generate a second clearance time estimate based at least on the second transcoding job backlog, on the second number of the internal transcoders, and on the second number of the external transcoders,
generate a second transcoder supply deviation by comparing at least the second clearance time estimate and the desired elapsed time to completion,
generate a trend indicator by comparing the first transcoder supply deviation with the second transcoder supply deviation, and
determine whether to activate one or more additional external transcoders for transcoding, deactivate one or more of the second number of the external transcoders from transcoding, or make no change to the second number of the external transcoders that are currently activated for transcoding, based at least on the second transcoder supply deviation and the trend indicator.

16. The content delivery network of claim 15, wherein one of the edge servers is configured as the transcoding manager.

17. The content delivery network of claim 16, wherein the one of the edge servers includes the transcoding queue.

18. The content delivery network of claim 15, wherein the transcoding queue is stored in the computer-readable media.

19. The content delivery network of claim 15, wherein at least two of the external transcoders of a plurality of cloud-based resources provide transcoding services at differing costs per megabyte of transcoding, and wherein when the transcoding manager determines whether to activate one or more additional external transcoders for transcoding or to deactivate one or more of the second number of the external transcoders from transcoding, the determination is also based on the differing costs per megabyte of transcoding.

20. The content delivery network of claim 15, wherein the transcoding manager is configured to manage jobs selected for the one or more of the second number of the external transcoders that should be deactivated such that all pending jobs for respective ones of the one or more transcoders are completed within a thirty second time window.

* * * * *